US009154805B2

(12) United States Patent
Bose (10) Patent No.: US 9,154,805 B2
(45) Date of Patent: Oct. 6, 2015

(54) VIDEO AND IMAGE COMPRESSION BASED ON POSITION OF THE IMAGE GENERATING DEVICE

(75) Inventor: Mrinal Bose, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 322 days.

(21) Appl. No.: 13/612,053

(22) Filed: Sep. 12, 2012

(65) Prior Publication Data
US 2014/0072028 A1  Mar. 13, 2014

(51) Int. Cl.
G06K 9/36 (2006.01)
G06K 9/46 (2006.01)
H04N 19/507 (2014.01)

(52) U.S. Cl.
CPC .................................. H04N 19/507 (2014.11)

(58) Field of Classification Search
None
See application file for complete search history.

(56) References Cited

U.S. PATENT DOCUMENTS

| 5,867,603 | A * | 2/1999 | Barnsley et al. ............. 382/249 |
| 7,203,356 | B2 | 4/2007 | Gokturk et al. |
| 7,227,977 | B1 * | 6/2007 | Dotsenko ...................... 382/118 |
| 7,817,717 | B2 | 10/2010 | Malayath et al. |
| 2005/0058359 | A1 * | 3/2005 | Tashman ....................... 382/243 |
| 2007/0154103 | A1 | 7/2007 | Au et al. |
| 2007/0237403 | A1 | 10/2007 | Keith |
| 2008/0187047 | A1 | 8/2008 | Stephan et al. |
| 2009/0087109 | A1 | 4/2009 | Li et al. |
| 2009/0097764 | A1 | 4/2009 | Sung |
| 2010/0007665 | A1 * | 1/2010 | Smith et al. .................. 345/473 |
| 2010/0097470 | A1 | 4/2010 | Yoshida et al. |
| 2011/0129012 | A1 | 6/2011 | Erlandson |
| 2011/0206118 | A1 | 8/2011 | Bivolarsky et al. |

OTHER PUBLICATIONS

Schwartz et al., "Video Compression and Retrieval of Moving Object Location Applied to Surveillance," Proceedings of the 6th International Conference on Image Analysis, pp. 906-916 (2009).

* cited by examiner

*Primary Examiner* — Phuoc Tran
(74) *Attorney, Agent, or Firm* — Volpe and Koenig, P.C.

(57) ABSTRACT

An apparatus, computer readable medium, and method of compressing images generated on an image generating device, the method including responsive to a generated image and position and orientation data associated with an image generating device which generated the image, selecting a previously generated image having a similar position and a similar orientation as the generated image; and if a comparison between the selected previously generated image and the generated image indicates the difference between one of the previously generated images and the generated image is less than a threshold difference, then compressing the generated image using the previously generated image. The method may include generating the generated image from light incident to the image generating device, and generating the position and orientation associated with the image generating device.

24 Claims, 7 Drawing Sheets

VIDEO AND IMAGE COMPRESSION BASED ON POSITION OF THE IMAGE GENERATING DEVICE

FIELD OF THE INVENTION

The present invention is generally directed to image compression, and in particular, to image compression based on a position and an orientation of the image generating device.

BACKGROUND

Users of image capturing devices such as cameras and mobile telephones often capture many images and videos. Videos are often stored as a series of images. The memory of the image capturing devices is often used to store the images and videos, although sometimes the images and videos are transferred to another device for storage. Users often prefer to store as many images and videos as possible. Additionally, users often prefer to use as little storage as possible to store images and video. An image capturing device may be called an image generating device since the device generates images and videos in capturing the images and videos.

SUMMARY OF EMBODIMENTS

Therefore, there is a need in the art for an apparatus, computer readable medium, and method of compressing images generated on an image generating device, the method including responsive to a generated image and position and orientation data associated with an image generating device which generated the image, selecting a previously generated image having a similar position and a similar orientation as the generated image; and if a comparison between the selected previously generated image and the generated image indicates the difference between one of the previously generated images and the generated image is less than a threshold difference, then compressing the generated image using the previously generated image.

The method may include storing the generated image compressed with the previously generated image; otherwise storing the generated image.

The method may include generating an image from light incident to the image generating device; and generating a position and orientation of the image capturing device at a time of the generating the image.

Selecting may further comprise selecting previously generated images generated within a predetermined time of a time of when the generated image was generated.

Selecting may further comprise selecting previously generated images stored in a cache of the image generating device.

Selecting may further comprise selecting previously generated images having an access time below a predetermined time.

Selecting may further comprise selecting previously generated images stored locally with the generated image.

Compressing may comprise storing the generated image as a reference to the previously generated image.

Compressing may comprise storing the generated image and storing the previously generated image as a reference to the generated image.

Selecting may further comprise if the previously generated image is stored as a previously generated image compressed with a second previously generated image, then retrieving the second previously generated image and replacing the previously generated image with the second previously generated image.

Selecting may further comprise if the previously generated image is stored as a previously generated image compressed with a second previously generated image and the previously generated image was generated within a predetermined time of a time when the image was generated, then retrieving the second previously generated image and replacing the previously generated image with the second previously generated image.

The method may further comprise if the comparison indicates the difference between one of the previously generated images and the generated image is less than a threshold difference, then storing at least a portion of the generated image or the previously generated image in a cache.

Otherwise storing the generated image may comprise compressing the generated image with conventional image compression and storing the generated image compressed with conventional image compression.

Comparing may comprise comparing groups of pixels of the previously generated image with corresponding groups of pixels of the generated image.

Storing the generated image may comprise storing the generated image with the position and orientation of the image capturing device.

A method may further comprise after at least one of: a predetermined time, a predetermined amount of storage being used by the stored generated images, or a predetermined number of generated images, removing the position and orientation stored with the generated image.

An image generating device is disclosed. The image generating device may include an image generator configured to generate an image from light incident to the image generating device; a position generator configured to generate a position of the image generating device at a time when the image is generated; an orientation generator configured to generate an orientation of the image capturing device at a time when the image is generated; a storage device configured to store generated images; a selection module configured to select a previously generated images for a comparison module to compare with the generated image, wherein the selection module is configured to select previously generated image having a similar position and a similar orientation as the generated image; the comparison module configured to compare the generated image with previously generated images; a position orientation compress module configured to compress the generated image using the previously generated, if the comparison between the generated image and the previously generated image indicates the difference between the previously generated image and the generated image is less than a predetermined difference (e.g., a threshold); and a store module configured to store the generated image and the compressed generated image.

The selection module may be further configured to select previously generated images generated within a predetermined time of a time when the generated image was generated.

The selection module may further be configured to select previously generated images generated with a similar position and with a similar orientation and stored in a cache of the image generating device.

The selection module may further be configured to retrieve a second previously generated image and replace the previously generated image with the second previously generated image, if the previously generated image is compressed with the second previously generated image.

The selection module may be further configured to retrieve a second previously generated image and replace the previously generated image with the second previously generated image, if the previously generated image is stored compressed with the second previously generated image and the previously generated image was generated within a predetermined time of a time when the image was generated.

The image generating device may be further configured to store at least a portion of the generated image or the previously generated image in a cache, if the difference between one of the previously generated images and the generated image is less than a predetermined difference.

A computer readable non-transitory medium is disclosed. The computer readable non-transitory medium including instructions which when executed in a processing system cause the processing system to execute a method for compressing images generated on an image generating device, the method comprising the steps of: generating an image from light incident to the image generating device; generating a position and orientation of the image capturing device at a time of the generating the image; comparing the generated image with previously generated images with a similar position and with a similar orientation; and if the comparison indicates the difference between one of the previously generated images and the generated image is less than a predetermined difference, then compressing the generated image using the previously generated image, and storing the generated image compressed with the previously generated image; otherwise storing the generated image.

BRIEF DESCRIPTION OF THE DRAWINGS

A more detailed understanding may be had from the following description, given by way of example in conjunction with the accompanying drawings wherein.

DETAILED DESCRIPTION OF EMBODIMENT(S)

Figure 1:
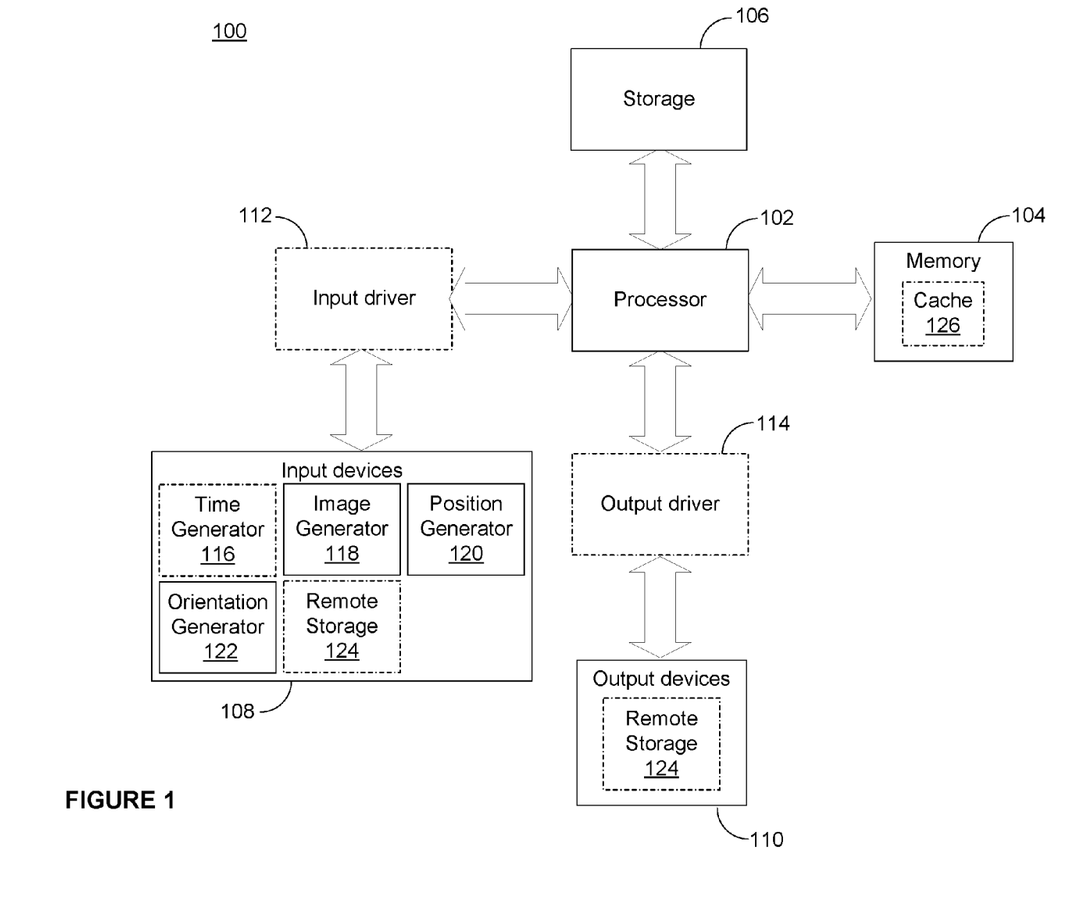
FIG. 1 is a block diagram of an example device in which one or more disclosed embodiments may be implemented.

FIG. 1 is a block diagram of an example device 100 in which one or more disclosed embodiments may be implemented. The device 100 may include, for example, an image generating device, camera, mobile phone, computer, a gaming device, a handheld device, a set-top box, a television, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. The memory 104 may include a cache 126 which may be a type of storage that may have faster access times than other portions of the memory 104.

The storage 106 may include a fixed or removable storage, for example, a hard disk drive, a solid state drive, an optical disk, or a flash drive.

The input devices 108 may include a time generator 116, an image generator 118, a position generator 120, orientation generator 122, and may include remote storage 124. The time generator 116 and remote storage 108 are optional. The time generator 116 may be a device that generates a chronological time such as time expressed in Coordinated Universal Time (UTC), its predecessor Greenwich Mean Time (GMT) or some other time standard. In embodiments, the time generator 116 receives the time over a network such as the Internet. The image generator 118 generates electrical signals representing light incident on the image generating device 100. The electrical signals may be processed by, for example, the processor 102 to form an image. An example of an image generator is a charge-coupled device (CCD). The remote storage 124 may be storage that is remote from the image generating device 100. Examples of remote storage 124 are storage over a network to anther device that provides storage. The input devices 108 may also include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The position generator 120 may be a Global Positioning System receiver (or other navigation or positioning system—satellite or otherwise—such as, for example, the Global Navigation Satellite System, the Galileo positioning system, etc.) to determine the position of the device 100. In embodiments, the position generator 120 may include a mobile-network based positioning system. An example of an orientation generator 122 is an accelerometer which detects an orientation of the device 100 in the X, Y, and Z axes.

The output devices 110 may include a display, a speaker, a printer, a haptic feedback device, one or more lights, an antenna, remote storage 124, or a network connection (e.g., a wireless local area network card for transmission and/or reception of wireless IEEE 802 signals). The remote storage 124 may be storage that is remote from the image generating device 100. An example of remote storage 124 is storage over a network such as the Internet to another device that provides storage.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2A:
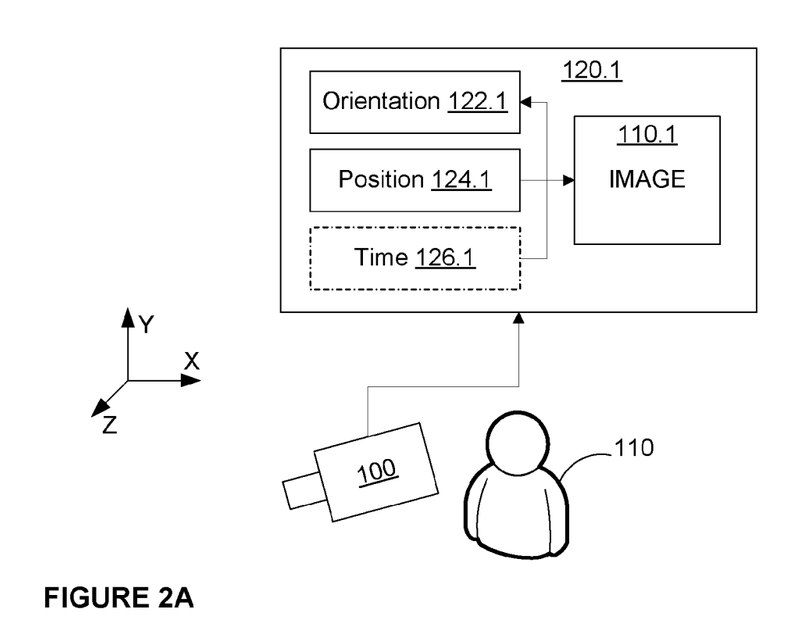
FIGS. 2A and 2B are illustrations of an image generating device being used by a user to generate images with a time, a position, and an orientation associated with the generated images.
Figure 2B:
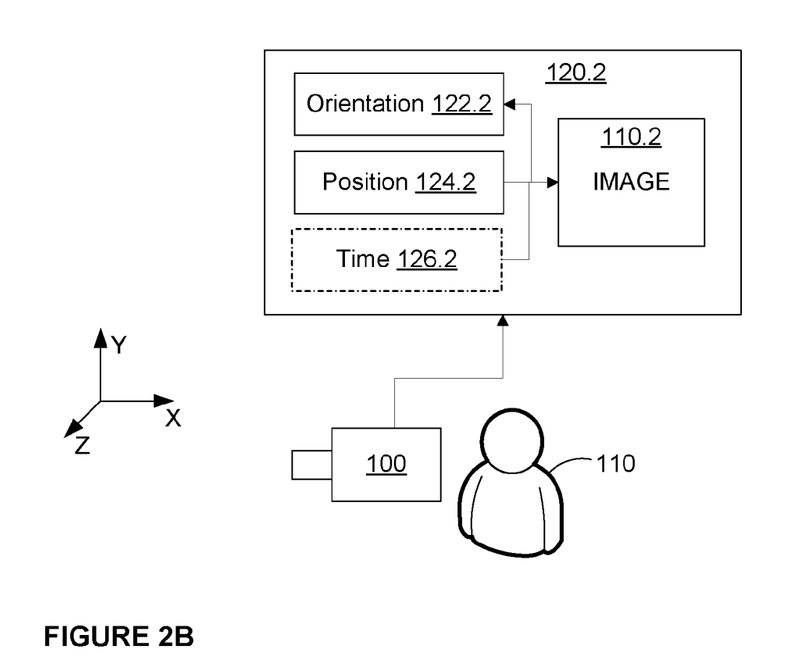

FIGS. 2A and 2B are illustrations of an image generating device being used by a user to generate images with an orientation, a position, and, optionally, a time associated with the generated images. Illustrated in FIG. 2A is a user 110 holding an image generating device 100 at an orientation 122.1 that is tilted downward. The image generating device 100 generates an image 100.1 from the light incident on the image generating device 100. The image generating device 100 also generates an orientation 126.1 and position 124.1 of the image generating device 100 at the time the image generating device 100 generates the image 100.1. The image generating device 100 may generate a time 122.1 of when the image generating device 100 generated the image 100.1. The image 110.1 is associated with the time 122.1, position 124.1, and orientation 126.1 in a frame 120.1. The orientation 122.1 indicates that the image generating device 100 is tilted downward. FIG. 2B illustrates the user 110 holding the image generating device 100 at a different orientation. The image generating device 100 generates a second image 100.1 from the light incident on the image generating device 100. The image generating device 100 also generates a second orientation 126.1 and a second position 124.1 of the image generating device 100 at the time 126.2 the image generating device 100 generates the second image 100.2. The image generating device 100 may generate a second time 122.2 of when the image generating device 100 generates the image 110.2. The image 110.2 is associated with the orientation 126.2, position 124.2, and, optionally, time 126.2 in a frame 120.2. In the example illustrated in FIGS. 2A and 2B, the image generating device 100 will not use the image 110.1 to compress the second image 110.2 because the orientation 126.1 of the first image 110.1 and the orientation 126.2 of the second image will not be similar or substantially the same and will have significantly different orientations, so the image generating device 100 will determine not to use the first image for the non-conventional position and orientation compression.

Figure 3:
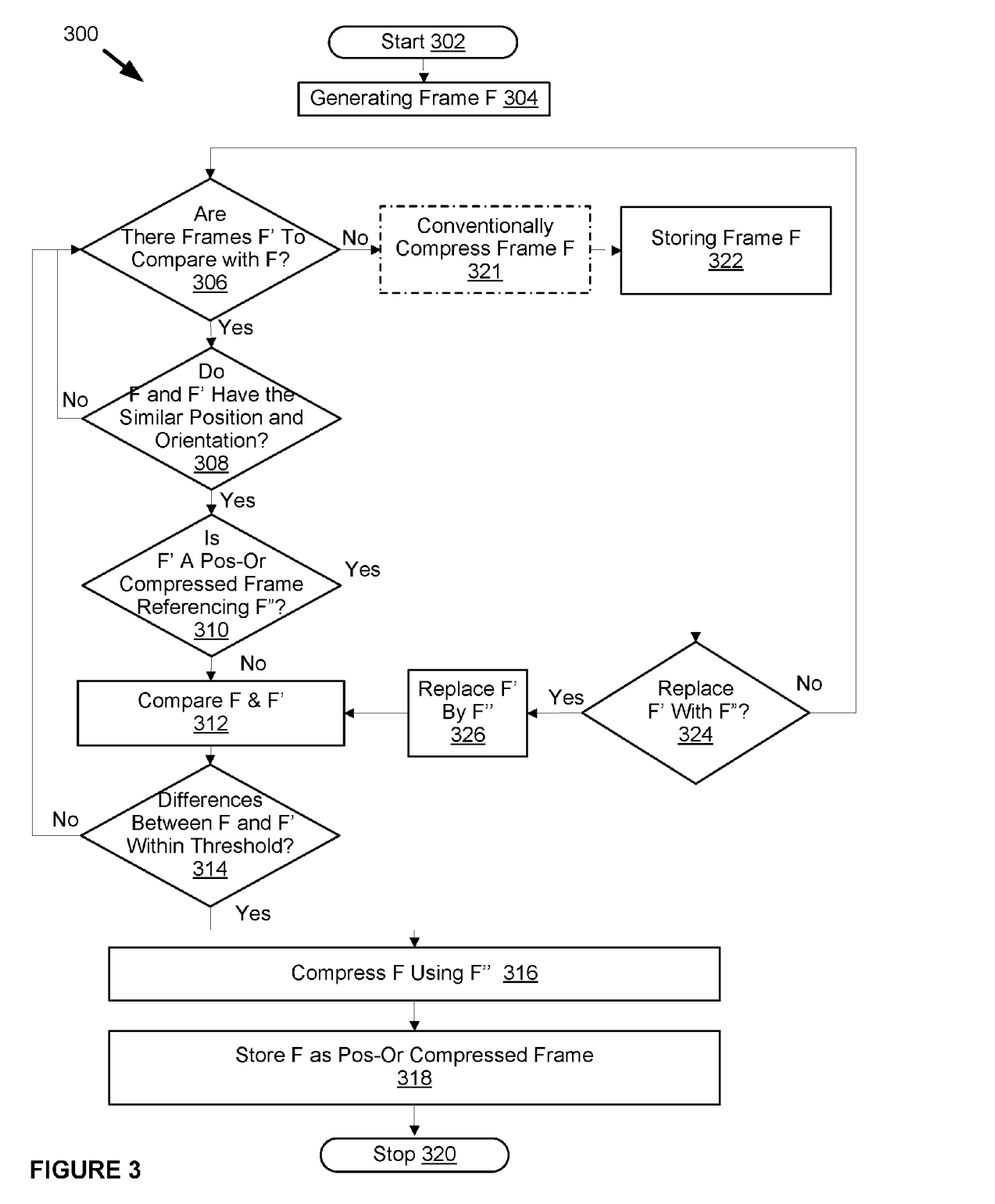
FIG. 3 is a block diagram of an example of a method of compressing images.
Figure 4:
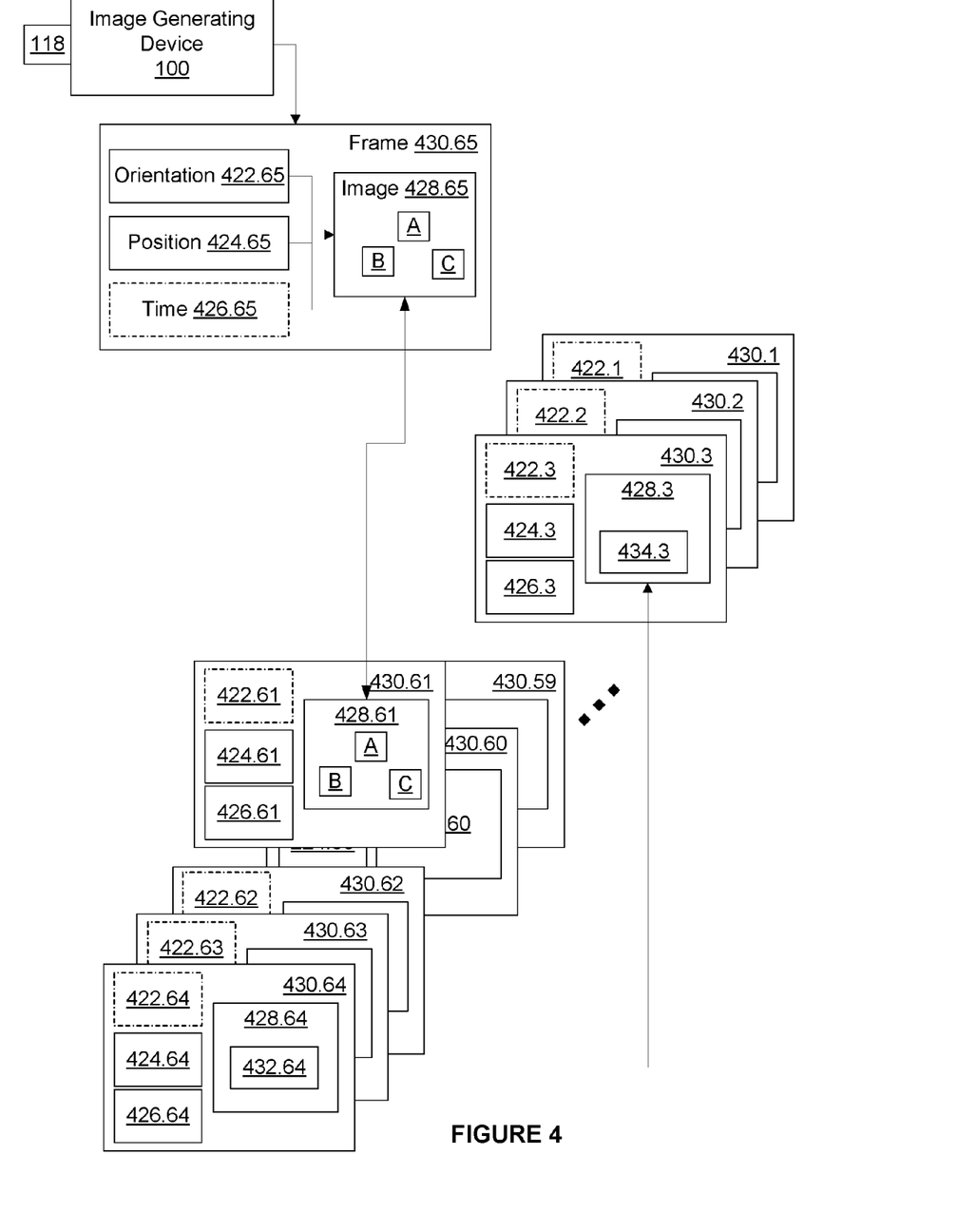
FIG. 4 is a block diagram of an example of an image generating device compressing images according to the method of FIG. 3.

FIG. 3 is a block diagram of an example of a method 300 of compressing images. The method of FIG. 3 is also explained with reference to FIG. 4. FIG. 4 is a block diagram of an example of an image generating device compressing images according to the method of FIG. 3. Illustrated in FIG. 4 is an image generating device 100 generating an image 428.65 associated with an orientation 422.65, a position 424.65, and, optionally, a time 426.65, which all may be considered a frame 430.65. The frame 430.65 includes an image 428.65, an orientation 422.65 of the image generating device 100 when the image 428.65 was captured, a position 424.65 of the image generating device 100 when the image 428.65 was captured, and, optionally, a time 426.65 when the image 428.65 was captured. FIG. 4 also illustrates previously generated images, image 428.1 to image 430.64, and frame 430.65 being compared with frame 430.61.

Referring to FIGS. 3 and 4, the method 300 starts with start (302). The method 300 continues with generating frame F (304). For example, the image generating device 100 of FIG. 4 generates frame 430.65.

The method 300 continues with an assessment to determine whether there are frames F' to compare with F (306). For example, as illustrated in FIG. 4, there are previously generated frames denoted F' 430.1 to 430.64 to compare with the generated frame F 430.65.

Since there are Frames F' 430.1 to 430.64 to compare with the generated frame F 430.65, the method 300 continues with YES with do frames F and F' have a similar orientation and similar position or substantially the same orientation and/or position (308). For example, the orientation 422.65 and position 424.65 of frame F 430.65 may be compared with the orientation 422.61 and position 424.61 of frame F' 430.61. The orientation 422.61 and orientation 422.65 may be within a threshold (which may be fixed or may be dynamically alterable—in some embodiments by a user or other input) so that orientation 422.61 and orientation 422.65 are considered to be similar or substantially the same. The position 424.61 and position 424.65 may be compared to determine that position 424.61 and position 424.65 are within a threshold so that position 424.61 and position 424.65 are considered similar or substantially the same. Since F 430.65 and F' 430.61 have similar or substantially the same orientation 422 and position 424, the method 300 continues with is F' a position-orientation compressed frame referencing F''' (310). Here, frame F''' refers to a previously generated frame that is being used to compress another frame, which may be referred to as a reference frame. Frame 430.3 is an example of F'' frame 430.3 is being used to compress frame 430.64. Continuing with the example in FIG. 4, 430.61 is not a position-orientation compressed frame since image 428.61 is not stored as a reference to another frame based on a position-orientation of the frame 430.61. So, since 430.61 is not a position-orientation compressed frame, then the method 300 continues with compare F with F' (312). For example, continuing with the example in FIG. 4, image 428.65 is compared with image 428.61. In embodiments, the comparison may be performed by selecting several groups of pixels from image 428.61 and comparing them with the corresponding groups of pixels from image 428.65. After the comparison the method 300 continues with differences between F and F' within a threshold based difference (314). For example, continuing with the example above, if the comparison between 428.61 and 428.65 indicates that the image 428.61 and image 428.65 are within a threshold of one another then image 428.61 and image 428.65 are considered to be the same, similar, or substantially the same. If image 428.61 and image 428.65 are not within a threshold, then the method 300 returns to are there frames F' to compare with F (306). Otherwise, if image 428.61 and image 428.65 are within a threshold, then the method 300 continues with compress F using F' (316). For example, continuing with the example above, image 428.65 may be compressed using 428.61. In embodiments, 428.65 may be compressed by substituting a pointer to image 428.61 for image 428.65, in which the pointer to image 428.61 indicates that the image 428.61 may be used to substitute for image 428.65. In embodiments, an indication that image 428.61 is being used to compress another image 428.61 may be stored with frame 430.61. The method 300 continues with store F as a position orientation compressed frame (318). For example, continuing with the example above, the image 428.65 portion of frame 430.65 may be stored with a pointer to image 428.61. In this way, storage is saved since image 428.65 may be stored as a pointer to another image without storing the entire image 428.65. In embodiments, image 428.65 may be stored with a pointer to image 430.61 and with differences that need to be applied to image 428.61 to derive image 428.65. The method would then continue with stop (320).

If at 308 frames 430.61 and 430.65 did not have similar or substantially the same position 424 and orientation 422, or if at 314 the differences between images 428.61 and 428.65 were not within a threshold difference, then the method 300 in the above example would have returned to are there frames F to compare with F (306). At 306, if there were no more frames F' to compare with F, then, in embodiments, the method 300 continues with conventionally compressing frame F (321). For example, the frame 430.65 may be compressed using moving picture experts group (MPEG) compression. The method continues with store frame F (322). For example, continuing with the example above, 430.65 may be stored in a memory 104 or storage 106 of the image generating device 100 without position orientation compression.

If, at 310, 430.61 was stored as a position-orientation compressed frame, then the method 300 in the above example would have continued with replace F' with F' (324). For example, continuing with the example above, if 430.61 was stored as a position orientation frame, then the F' may be replaced with F''' based on some of the following. As another example, image 432.64 is a position-orientation compressed frame, so image 432.64, F', would have been replaced with 428.3, F'''. In embodiments, if F''' was stored in a cache, then F' may be replaced with F'''. If F''' was stored not locally, then F''' may not be replaced with F'. If the access time to retrieve F''' is too long, then F' may not be replaced with F'''. The above are just some example embodiments to determine whether or not to replace F' with F'''. An example of a position oriented compressed frame is illustrated in FIG. 4 as frame 430.64 where image 428.64 is stored as a pointer to image 428.3. In this case, replace F' with F''' for image 428.64 would mean to use image 428.3 in place of image 428.64.

If F' is not replaced with F''', then the method 300 returns to 306 as described above. If F' is replaced with F''', then the method 300 continues with replace F' with F''' (326), and the method 300 continues as described above at 312. The method 300 may be repeated for each newly generated image 428.

In embodiments, the method 300 may be performed on images that are part of a moving picture, e.g. a video. Additionally, in embodiments, still images may be compared with images that are part of a moving picture, and images that are part of moving picture may be compared with still images. Moreover, images that are part of moving picture may be compared with one another based on the orientation, position, and optionally, time, of the image generating device 100.

Figure 5:
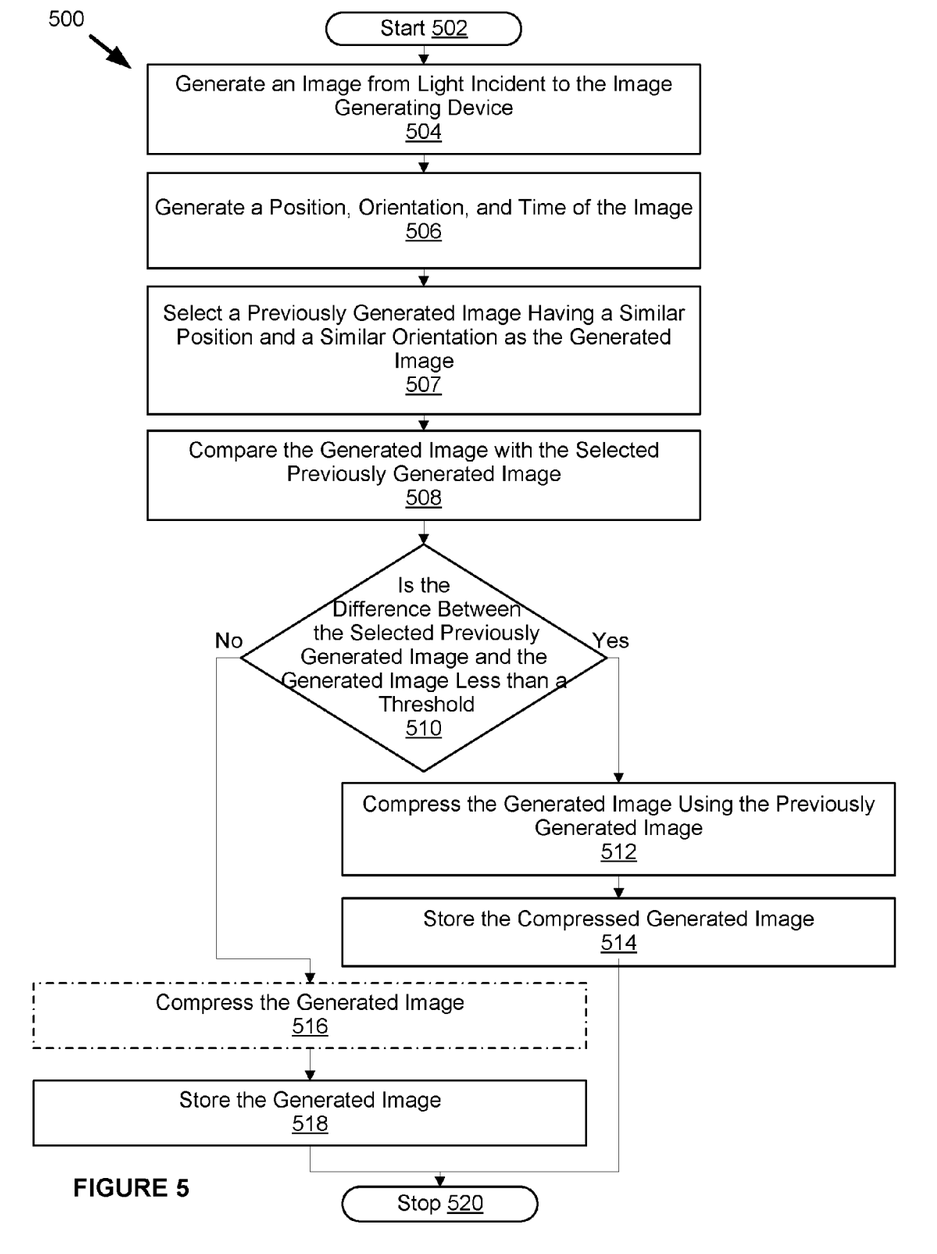
FIG. 5 is a block diagram of another example of a method of compressing images.

FIG. 5 is a block diagram of another example of a method 500 of compressing images. The method 500 begins with start (502). The method 500 continues with generating an image from light incident to the image generating device (504). For example, referring to FIG. 4, the image generator 118 may generate an image 428.65. The method 500 continues with generate a position, orientation, and time of the image (506). For example, referring to FIGS. 1 and 4, the orientation generator 122 may generate an orientation 422.65, the position generator 120 may generate a position 424.65, and the time generator 116 may generate a time. The orientation and position of the image generating device 100 may be associated with the image and the time the image was captured may be associated with the image. The method 500 may perform 504 and 506 in a different order or, in embodiments, simultaneously. 504 and 506 may be optional and be performed on a different device. The method 500 continues with select a previously generated image having a similar position and a similar orientation as the generated image (507). For example, referring to FIG. 4, the image generating device 100 may compare the image 428.65 with images 428.1 through 428.64 to determine whether any of the previously generated images 428.1 through 428.64 were generated with a similar position 424 and orientation 422 of the image generating device 100. In embodiments, if there are no previously generated images with a same position and with a same orientation as the generated image, then the method 500 may continue at 516, which is discussed below.

The method continues with compare the generated image with selected previously generated images (508). For example, referring to FIG. 4, selected portion of image 428.65 may be compared with the corresponding portion of image 428.61.

The method 500 continues with is there a difference between the selected previously generated image and the generated image less than a threshold (510). For example, referring to FIG. 4, the image generating device 100 may compare image 428.65 with image 428.61, and determine whether the differences between the two images is less than a threshold.

If the difference between the two images is less than a threshold, then the method 500 continues with compress the generated image using the previously generated image (512). For example, referring to FIG. 4, the image generating device 100 may compress image 428.65 by substituting image 428.65 with a pointer to image 428.61. The method 500 continues with store the compressed generated image (514). For example, referring to FIGS. 1 and 4, the image generating device 100 may store frame 430.65 in memory 104 or storage 106 with image 428.65 being represented by a pointer to image 428.61. As discussed above, an example of an image 428 stored as a pointer to another image 428 is image 428.64 which is stored as a pointer to image 428.3. The method 500 continues with stop (520).

If at 508 there are not previously generated images with a substantially similar position and a substantially similar orientation, or if at 510 the difference between the previously generated images and the generated image is not less than a threshold, then the method 500 may continues with compress the generated image (516). For example, the image generating device 100 may use conventional compression methods to compress the generated image. The method continues at 518 with "Storing the Generated Image." For example, referring to FIGS. 1 and 4, the image generating device 100 may store the generated image 428.65 in memory 104 or storage 106, or in embodiments, in remote storage 124. The method continues with stop (520).

Figure 6:
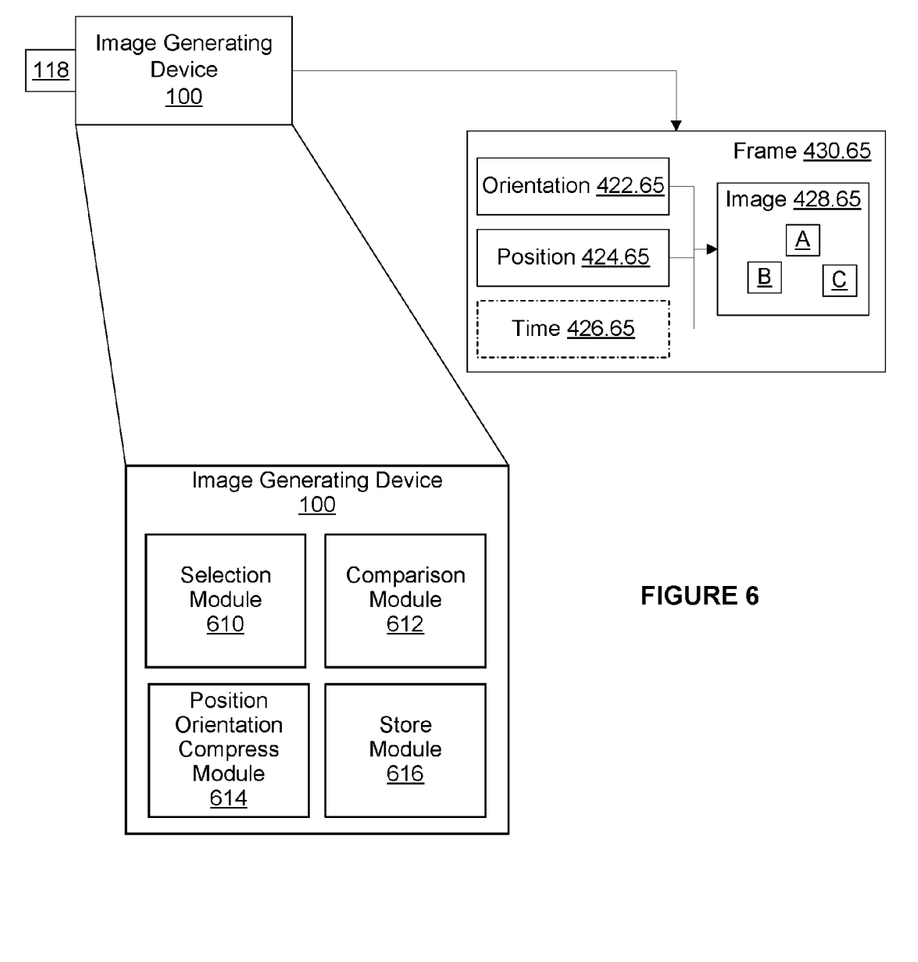
FIG. 6 is a block diagram of another example of an image generating device 100 in which one or more disclosed embodiments may be implemented.

FIG. 6 is a block diagram of another example of an image generating device 100 in which one or more disclosed embodiments may be implemented. As illustrated, the image generating device 100 has generated a frame 430.65. The image generating device 100 may include an image generator 118, a selection module 610, a comparison module 612, a position orientation compress module 614, and a store module 616.

The selection module 610 may be configured to determine which previously generated images for the comparison module 612 to compare with the generated image. For example, the selection module 610 may determine that images 428 that were previously generated with a similar orientation 422 and a similar position 424 should be compared with the generated image 428.65. For example, referring to FIG. 4, the selection module 610 may compare the orientation 422 and the position 424 of the previously generated images 428.1 through 428.64 with the generated image 428.65 to determine which of the previously generated images 428.1 through 428.65 should be used by the comparison module 612 to compare with the generated image 428.65. The selection module 610 may determine that only images 428 that were previously generated within a time threshold of the generated image 428.65 should be compared with the generated image 428.65. The selection module 610 may determine that only images 428 that were previously generated and are stored in a memory 104 or a cache 126 should be compared with the generated image 428.65. The selection module 610 may determine that only images 428 that are stored locally on the image generating device 100 should be compared with the generated image 428.65. The selection module 610 may determine that only images 428 that can be retrieved from storage 106 or remote storage 124 in less than a time threshold should be compared with the generated image 428.65. The selection module 610 may determine that a previously generated image is stored as a previously generated image compressed with a second previously generated image. The selection module 610 may then determine whether to retrieve the second previously generated image to compare with the generated image 428.65 based on any of the methods discussed above. The selection module 610 may be configured to only follow a specified number of links (which may be dynamically modified) used to store compressed images 428. For example, the selection module 610 may determine that an image 428.61 is compressed using frame 428.45, and then determine that 428.45 is compressed using frame 428.32, which is also compressed. The selection module 610 may determine to only follow, for example, two links prior to not selecting the image 428 for comparison with the generated image 428.65. The selection module 610 may be configured to compare the generated image 428.65 with all images that are currently stored in a memory 104 or cache 126.

The comparison module 612 is configured to compare previously generated images 428 with the generated image 428.65. The comparison between the previously generated images and the generated image 428.65 may be performed as discussed above. Other methods of comparing the previously generated images 428 with the generated image 428.65 include comparing all the pixels of the two images, comparing edge pixels of the two images, as well as conventional image comparison methods. An example of a comparison method is comparing rectangular regions A, B, C of image 428.65 with the corresponding rectangular regions of a previously generated image 428, and if the difference is less than a threshold then determining that the two images are equal. The position orientation compress module 614 may be configured to compress the generated image 428 by replacing the generated image 428 by a pointer to a previously generated image 428.

The store module 616 may be configured to store the compressed generated image 428.65 as well as to store the generated image 428.65 without compression. When a previously generated image 428 is used to compress a generated image 428.65, the store module 616 may store a portion of the previously generated image and associated data used to compare the previously generated image 428 with generated images 428.65 in a memory 104 or cache 126 so that it may be easier to compare the previously generated image 428 with newly generated images 428.65. The store module 616 may be configured to determine whether or not to remove associated data with the image 428. For example, the store module 616 may be configured to remove the orientation 422, position 424, and time 426 from being associated with the image 428 after an amount of time has elapsed since the image 428 was generated. The store module 616 may determine whether to remove the associated data based on whether or not the image 428 has been used to compress another image 428. The store module 616 may determine whether to remove associated data based on an amount of storage available on the image generating device 100. The store module 616 may be configured to store a portion of an image 428 and associated data in a cache 126 when the image 428 is used for compression. The store module 616 may manage the cache 126 by removing images 428 that have not been used recently from the cache 126 to free up room for images 428 that have been recently used for compression. The store module 616 may be configured to store with a frame 430 an indication of whether the frame 430 was used to compress another frame 430.

Figure 7:
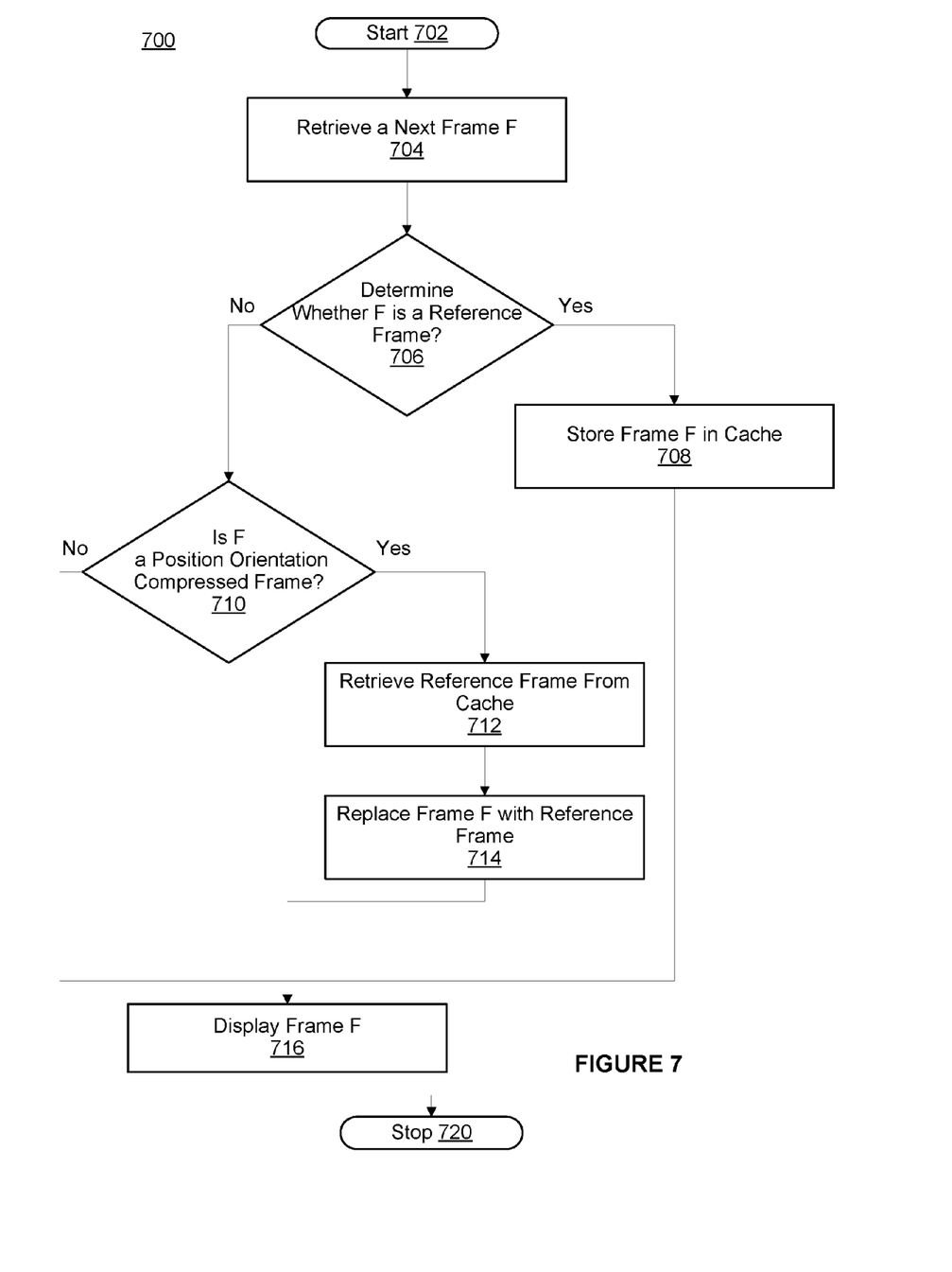
FIG. 7 is a block diagram of a method of de-compressing images compressed according to an embodiment of the method of compressing images disclosed in FIGS. 3 and 5.

FIG. 7 is a block diagram of an example of a method of de-compressing images or videos. The method for de-compressing may be used to display the captured images. For example, a movie, an image, or a series of images, may be displayed on a display in communication with the image generating device 100. The method begins at 702 with "Start." The method continues at 704 with "Retrieving a Next Frame F." For example, referring to FIG. 4, the image generating device may retrieve a frame 430.1, which may be stored in a memory 104 or storage 106 of the image generating device 100. The method continues at 706 with "Determining whether F is a reference frame." The image generating device 100 may determine whether F is a reference frame by examining the frame 430 which may include data that indicates whether or not frame F was used to compress another frame. If the frame F was a reference frame, the method continues at 708 with "Storing Frame F in a cache." For example, the image generating device 100 may store the frame F in a memory 104 or cache 126 so that the frame F is available to decompress the frame or frames that were compressed using frame F. For example, referring to FIG. 4, frame 430.3 is a reference frame which may have an indication (not illustrated) stored with the reference frame 430.3 that it was used as a reference frame. When frame 430.3 is retrieved, it may be stored in memory 104 or cache 126 so that it can be used to de-compress frame 430.64. The method continues at 716 with "Displaying Frame F." For example, the image generating device 100 may display the frame F from the memory 104 or cache 126. The method continues at 720 with "Stop."

Referring back to 706, if the Frame F is not a reference frame, then the method continues at 710 with "Is F a Position Orientation Compressed Frame." If the Frame F is not a position orientation compressed frame, then the method continues at 716 as discussed above. Frame F may be compressed by other methods in which case prior to or in conjunction with 716, frame F may be decompressed using other methods. Referring back to 710, if frame F is a position orientated compressed frame, then the method continues at 712 with retrieving reference frame from cache. For example, referring to FIG. 4, since frame 430.64 was compressed with frame 430.3, then the method would store frame 430.3 in a cache 126 prior to retrieving frame 430.64, since 430.3 would need to played before 430.64 and since 430.3, according to embodiments, would be stored with an indication that it had been used to compress another frame. At 712 frame 430.3 would be retrieved from cache 126. The method continues at 714 with "Replacing frame F with Reference Frame." For example, frame 430.64 would be replaced with frame 430.3. In embodiments, the image 428.64 may have a reference pointer to frame 430.3, and so the image 428.64 may be replaced by the image 428.3. The method continues at 716 with displaying the Frame F. Continuing with the example above, image 428.64 would be displayed which may be the same image as 428.3. The method continues at 720 with "Stop." In embodiments, the Frame F may need to be decompressed with a known decompression method prior to being displayed.

Embodiments may have the advantage that storage and transmission bandwidth may be reduced by storing some images compressed using another frame with the same position and orientation.

In embodiments, additional compression may be performed to further compress reference frames. Additionally, compression may have been done prior to the comparison for position orientation compression.

Embodiments may have the advantage that a camera recording images (still or moving images) of a mostly static subject or landscape can be compressed with the methods described above. Imaging applications in the fields of medicine (endoscopy), space, deep-sea or sub-surface exploration and surveillance may have many frames that can be compressed using the methods described above. Moreover, the bandwidth available in these applications is often low, and often the user of the device move the device slowly during operation, which may enable many frames to be compressed using the methods described above.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). The computer-readable storage may be non-transitory.

What is claimed is:

1. A method of compressing images generated on an image generating device, the method comprising:
    responsive to a generated image and position and orientation data associated with an image generating device which generated the image, selecting a previously generated image having a similar position and a similar orientation as the generated image;
    comparing the selected previously generated image with the generated image; and
    if the comparison between the selected previously generated image and the generated image indicates a difference between the selected previously generated image and the generated image is less than a threshold difference, then compressing the generated image using the selected previously generated image.

2. The method of claim 1, further comprising:
    if the generated image is compressed using the selected previously generated image, then storing the compressed generated image, otherwise storing the generated image.

3. The method of claim 2, wherein otherwise storing the generated image comprises:
    compressing the generated image with conventional image compression and storing the generated image compressed with conventional image compression.

4. The method of claim 1, further comprising:
    generating the generated image from light incident to the image generating device, and generating the position and orientation associated with the image generating device.

5. The method of claim 1, wherein the selected previously generated image and the generated image are part of separate files of images.

6. The method of claim 1, wherein selecting further comprises:
    selecting previously generated images generated within a time threshold of a time when the generated image was generated.

7. The method of claim 1, wherein selecting further comprises:
    selecting previously generated images stored in a cache of the image generating device.

8. The method of claim 1, wherein selecting further comprises:
    selecting previously generated images having an access time below a time threshold.

9. The method of claim 1, wherein selecting further comprises:
    selecting previously generated images stored locally with the generated image.

10. The method of claim 1, wherein compressing comprises:
    storing the generated image as a reference to the selected previously generated image.

11. The method of claim 1, wherein compressing comprises:
    storing the generated image and storing the selected previously generated image as a reference to the generated image.

12. The method of claim 1, wherein selecting further comprises:
    if the previously generated image is stored as a previously generated image compressed with a second previously generated image, then retrieving the second previously generated image and replacing the previously generated image with the second previously generated image.

13. The method of claim 1, wherein selecting further comprising:
    if the previously generated image is stored as a previously generated image compressed with a second previously generated image and the previously generated image was generated within a threshold time of when the generated image was generated, then retrieving the second previously generated image and replacing the previously generated image with the second previously generated image.

14. The method of claim 1, further comprising:
    if the comparison indicates the difference between the selected previously generated image and the generated image is less than a threshold difference, then storing at least a portion of the generated image or the selected previously generated image in a cache.

15. The method of claim 1, wherein storing the generated image comprises storing the generated image with the position and orientation of the image capturing device; and wherein the method further comprises:
    after at least one of: a threshold time, a threshold amount of storage being used by the stored generated images, or a threshold number of generated images, removing the position and orientation stored with the generated image.

16. An image generating device, the image generating device comprising:
  a selection module configured to select a previously generated image having a similar position and a similar orientation as a generated image having position and orientation data associated with the image generating device which generated the image;
  a comparison module configured to compare the generated image with selected previously generated images; and
  a position orientation compress module configured to compress the generated image using a selected previously generated image if a comparison between the generated image and the selected previously generated image indicates a difference between the selected previously generated image and the generated image is less than a threshold difference.

17. The image generating device of claim 16, further comprising:
  an image generator configured to generate the generated image from light incident to the image generating device;
  a position generator configured to generate the position data associated with the image generating device; and
  an orientation generator configured to generate the orientation data associated with the image generated device.

18. The image generating device of 16, further comprising:
  a storage device configured to store generated images; and
  a store module configured to store the generated image and the compressed generated image.

19. The image generating device of claim 16, wherein the selection module is further configured to:
  select the previously generated image generated within a threshold time of a time when the generated image was generated.

20. The image generating device of claim 16, wherein the selection module is further configured to:
  select the previously generated image generated with a similar position and with a similar orientation as the generated image and stored in a cache of the image generating device.

21. The image generating device of claim 16, wherein the selection module is further configured to:
  retrieve a second previously generated image and replace the previously generated image with the second previously generated image, if the previously generated image is compressed with the second previously generated image.

22. The image generating device of claim 16, wherein the selection module is further configured to:
  retrieve a second previously generated image and replace the previously generated image with the second previously generated image, if the previously generated image is stored compressed with the second previously generated image and the previously generated image was generated within a predetermined time of a time when the image was generated.

23. The image generating device of 16, wherein the image generating device is further configured to:
  store at least a portion of the generated image or the selected previously generated image in a cache, if the difference between the selected previously generated images and the generated image is less than a threshold difference.

24. A computer readable non-transitory medium including instructions which when executed in a processing system cause the processing system to execute a method for compressing images generated on an image generating device, the method comprising the steps of:
  responsive to a generated image and position and orientation data associated with an image generating device which generated the image, selecting a previously generated image having a similar position and a similar orientation as the generated image;
  comparing the selected previously generated image with the generated image; and
  if the comparison between the selected previously generated image and the generated image indicates a difference between the selected previously generated image and the generated image is less than a predetermined difference, then compressing the generated image using the selected previously generated image.

* * * * *